United States Patent
Shahi et al.

(10) Patent No.: US 10,541,637 B2
(45) Date of Patent: *Jan. 21, 2020

(54) SYSTEM-SPECIFIC INTERFACE MODULE FOR MOTOR CONTROL SUBASSEMBLY FOR ELECTRIC MOTOR

(71) Applicant: Nidec Motor Corporation, St. Louis, MO (US)

(72) Inventors: Prakash B. Shahi, St. Louis, MO (US); Anandan C. Velayutham, St. Louis, MO (US); Douglas D. Glenn, Litchfield, IL (US); Christopher D. Schock, O'Fallon, MO (US); James L. Skinner, Collinsville, IL (US); Randy L. Bomkamp, Creve Coeur, MO (US); Mark E. Carrier, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/868,814

(22) Filed: Jan. 11, 2018

(65) Prior Publication Data
US 2019/0173408 A1    Jun. 6, 2019

Related U.S. Application Data

(63) Continuation of application No. 15/176,941, filed on Jun. 8, 2016, now Pat. No. 9,899,949.
(Continued)

(51) Int. Cl.
*H02P 27/06*    (2006.01)
*H02K 11/04*    (2016.01)
(Continued)

(52) U.S. Cl.
CPC ............ *H02P 27/06* (2013.01); *H02K 5/225* (2013.01); *H02K 11/0094* (2013.01);
(Continued)

(58) Field of Classification Search
None
See application file for complete search history.

(56) References Cited

U.S. PATENT DOCUMENTS 4,542,380 A * 9/1985 Beckner ................. H04L 29/06
370/300
5,278,848 A * 1/1994 Yamaguchi ........... H04L 12/423
370/258

(Continued)

*Primary Examiner* — Rina I Duda
(74) *Attorney, Agent, or Firm* — Hovey Williams LLP

(57) ABSTRACT

A system-specific interface module for a motor control subassembly for controlling operation of an electric motor within a larger system which uses a particular system communication method. The motor control subassembly includes a standard power module and the interface module. The power module includes a controller processor configured to receive input for controlling and to generate output regarding operation of the motor. The interface module includes a communication interface hardware block configured to exchange input and output signals with the larger system, and an interface processor configured to translate the input and output signals between the particular system communication method used by the larger system and a standard internal communication method used by the power module. Thus, the motor control subassembly can be configured to accommodate any of a variety of different system communication methods and other input/output options by selecting and inserting the appropriate interface module.

20 Claims, 4 Drawing Sheets

Related U.S. Application Data

(60) Provisional application No. 62/173,236, filed on Jun. 9, 2015, provisional application No. 62/245,172, filed on Oct. 22, 2015.

(51) Int. Cl.
  *H02K 11/33* (2016.01)
  *H02K 5/22* (2006.01)
  *H02K 11/00* (2016.01)
  *H02K 11/35* (2016.01)

(52) U.S. Cl.
  CPC .......... *H02K 11/044* (2013.01); *H02K 11/33* (2016.01); *H02K 11/35* (2016.01)

(56) References Cited

U.S. PATENT DOCUMENTS

| | | | | |
|---|---|---|---|---|
| 6,653,744 B2 * | 11/2003 | Stricker | ............... | F03B 15/06 290/6 |
| 7,231,467 B2 * | 6/2007 | Baker | ............... | G06F 13/423 710/110 |
| 7,849,243 B2 * | 12/2010 | Wagh | ............... | G06F 13/385 710/105 |
| 8,601,190 B2 * | 12/2013 | Pipho | ............... | G06F 13/364 710/110 |

* cited by examiner

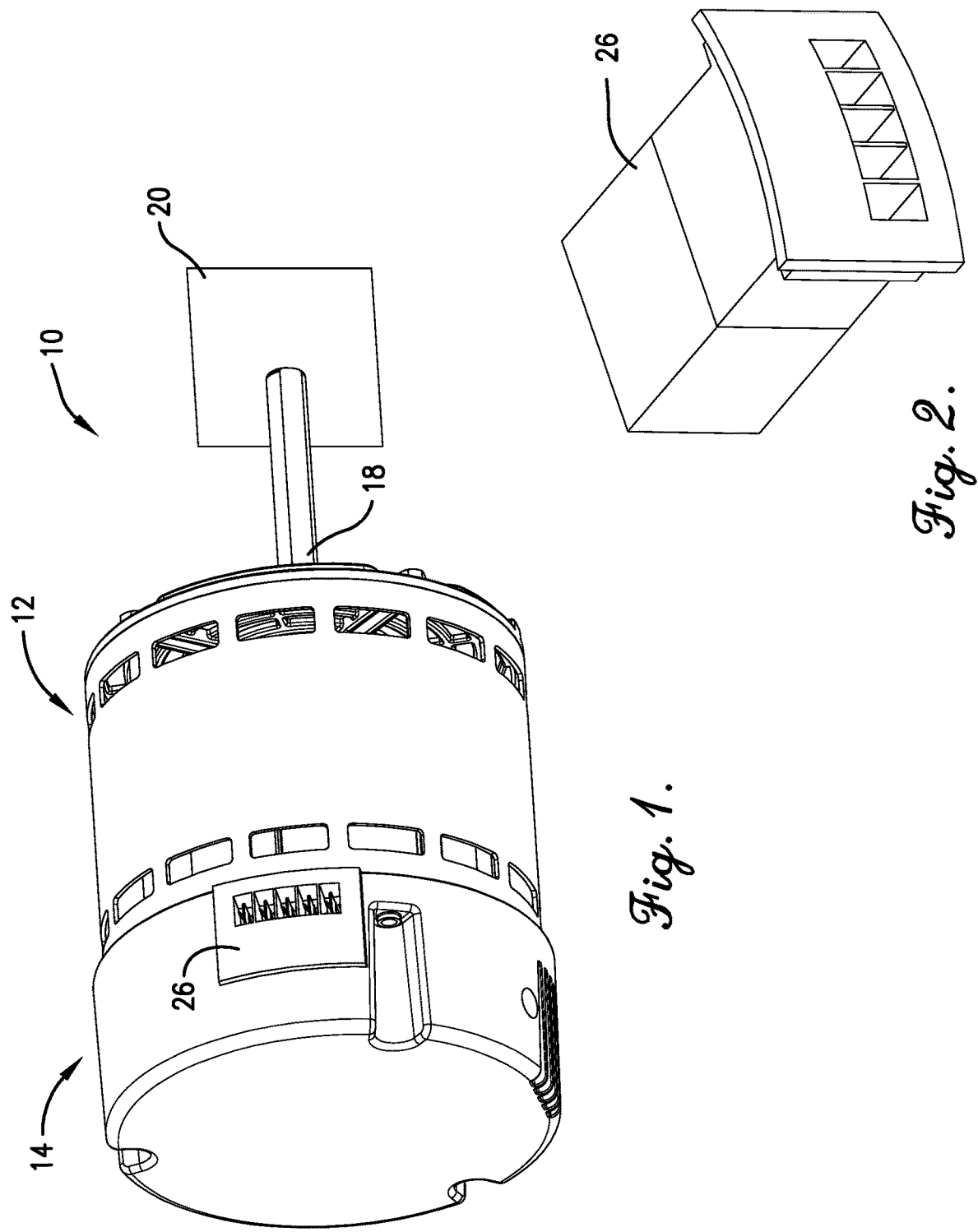

SYSTEM-SPECIFIC INTERFACE MODULE FOR MOTOR CONTROL SUBASSEMBLY FOR ELECTRIC MOTOR

RELATED APPLICATIONS

The present U.S. non-provisional patent application is a continuation and claims priority benefit of a prior-filed U.S. non-provisional patent application having the same title, Ser. No. 15/176,941, filed Jun. 8, 2016, and is related to and claims priority benefit of a first prior-filed U.S. provisional patent application having the same title, Ser. No. 62/173,236, filed Jun. 9, 2015, and a second prior-filed U.S. provisional patent application having the same title, Ser. No. 62/245,172, filed Oct. 22, 2015. The entire contents of the identified prior-filed applications are hereby incorporated by reference into the present application as if fully set forth herein.

FIELD

The present invention relates to systems and methods for controlling the operation of electric motors, and, more particularly, to a system-specific interface module for a motor control subassembly for controlling the operation of an electric motor using any of a plurality of different system communication methods.

BACKGROUND

Systems incorporating electric motors may employ any of a variety of different system communication methods, based on but not limited to RS485, RS232, analog 0 V to 10 V, industrial (4 mA to 20 mA) current loop, pulse width modulation (PWM), 24 VAC 120 V/240 V, 12 VDC, 24 VDC, 16 pin interface, and wireless. Furthermore, such systems may use any of a variety of different connector hardware options, such as different headers using multiple pins. Input may also be provided by, e.g., potentiometers or voltage or current sensors, and output may also be provided by, e.g., light emitting diodes. Motor control subassemblies for controlling the operations of the electric motors must be able to accommodate this variety of different system communication methods as well as these different hardware and input/output options. The current method used in accomplishing this is to install a specific motor control subassembly in a specific electric motor destined for a specific system using a specific system communication method, but such specificity can be inefficient with regard to maintaining stocks of each of the different communication method-specific motor control subassemblies.

This background discussion is intended to provide information related to the present invention which is not necessarily prior art.

SUMMARY

Embodiments of the present invention solve the above-described and other problems and limitations by providing a system-specific interface module for a motor control subassembly, wherein the system-specific interface module is swappable to accommodate any of a plurality of different system communication methods and other system-specific options with minimal changes.

In accordance with an embodiment of the present invention, the system-specific interface module is provided for the motor control subassembly for controlling operation of the electric motor within a larger system, wherein the larger system uses a particular system communication method. The motor control subassembly may have a standard power module and the system-specific interface module. The standard power module may include a power converter configured to convert alternating current to direct current, a controller processor configured to receive input for controlling operation of the electric motor and to generate output regarding operation of the electric motor, and a power inverter configured to convert the direct current to alternating current to drive the electric motor. The system-specific interface module may include a communication interface hardware block configured to exchange input signals and output signals with the larger system using the particular system communication method, and an interface processor configured to translate the input signals from the particular system communication method used by the larger system into a standard internal communication method used by the power module, and to translate the output signals from the standard internal communication method used by the power module into the particular system communication method used by the larger system. The power module may not be specifically configured to accommodate the particular system communication method, while the interface module may be specifically configured and insertable into the motor control subassembly to accommodate the particular system communication method.

In various implementations, the system-specific interface module may further include any one or more of the following features. The electric motor may be a three-phase, multi-pole alternating current induction, permanent magnet, or switched reluctance motor having a shaft configured to drive a load. The load may be selected from but not limited to the group consisting of fans, pumps, blowers, and rotating drums. The larger system may be a residential or commercial machine selected from but not limited to the group consisting of clothes dryers, clothes washers, ovens, heating units, ventilation units, air-conditioning units, refrigeration units, and pool pumps. The interface module may be connected to the power module by a header or by a wiring harness. The motor control subassembly may further include an isolation transformer, wherein isolated power is provided by the power module to the interface module via the isolation transformer. The particular system communication method may be selected from the group consisting of RS485, RS232, analog 0 V to 10 V, industrial (4 mA to 20 mA) current loop, pulse width modulation (PWM), 24 VAC 120 V/240 V, 12 VDC, 24 VDC, 16 pin interface, and wireless. The interface module may be further configured to receive and translate input from a potentiometer or from a voltage or a current sensor into the standard internal communication method used by the power module. The interface processor may communicate directly with the controller processor. The interface module may be provided on one or more printed circuit boards which are insertable into the motor control subassembly.

The interface module may further include an input element for receiving an input signal from a sensor and communicating the input signal to the interface processor, and the interface processor may translate the input signal into the standard internal communication method used by the power module. The sensor may be selected from among speed sensors, voltage sensors, current sensors, temperature sensors, airflow sensors, and waterflow sensors. The interface module may further include an output element for relaying the input signal as an output signal to the larger system, and the interface processor may translate the output signal into the particular system communication method used by the larger system.

Additionally, each of these embodiments and implementations may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is an isometric view of an embodiment of an electric motor assembly incorporating an embodiment of the system-specific interface module of the present invention;

FIG. 2 is an isometric view of the system-specific interface module of FIG. 1;

Figure 3A:
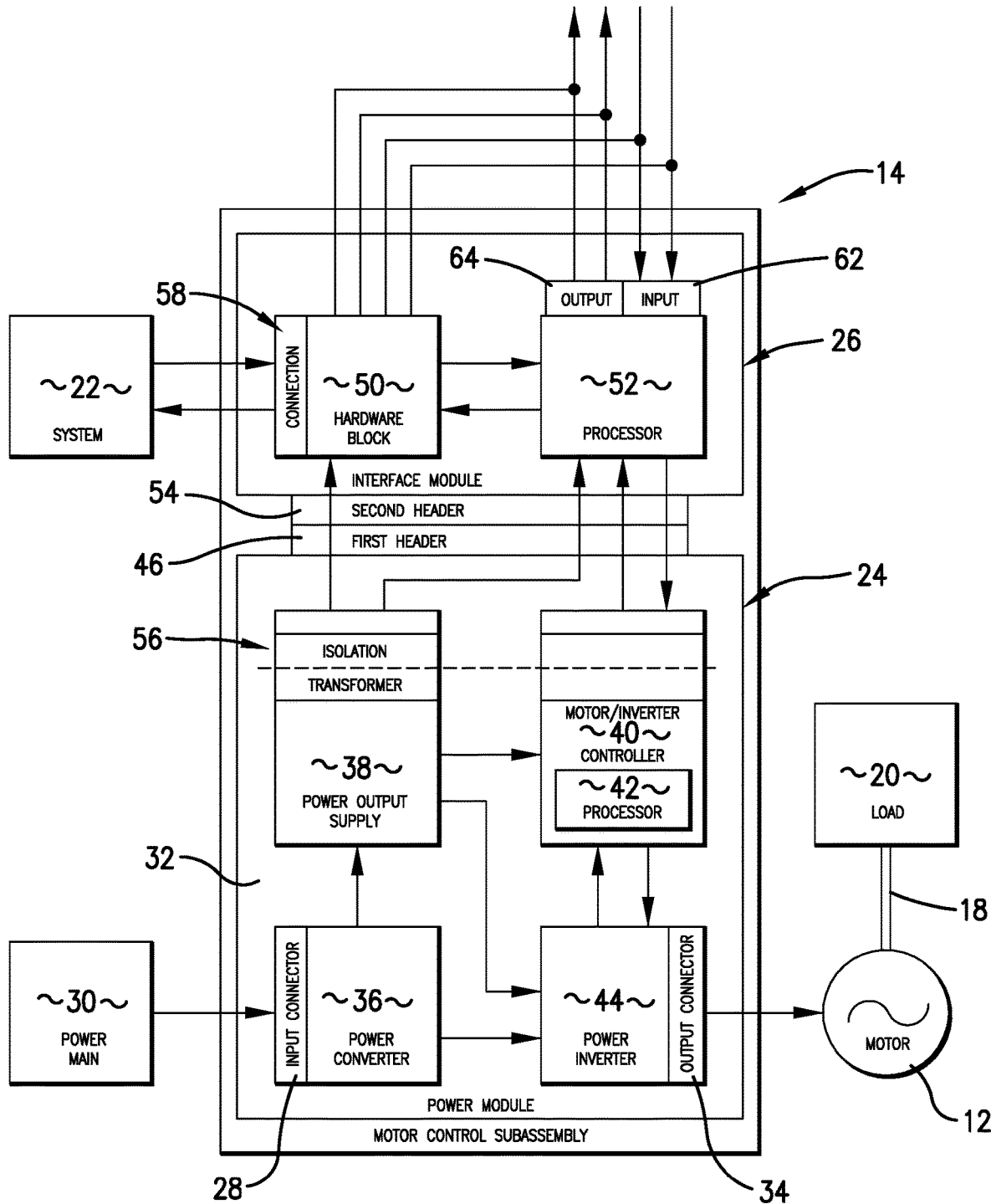
FIG. 3A is a block diagram showing various components of a first implementation of the motor control subassembly of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention is a system-specific interface module for a motor control subassembly for controlling the operation of an electric motor using any of a plurality of different system communication methods. More specifically, the system-specific interface module is swappable to accommodate any of the plurality of different system communication methods and other system-specific options with minimal changes.

Referring to FIGS. 1 and 2, an embodiment of an electric motor assembly 10 may incorporate the electric motor 12, the motor control subassembly 14, and the interchangeable interface module 26. The electric motor 12 may be a three-phase, multi-pole alternating current (AC) induction, permanent magnet, or switched reluctance motor. The electric motor 12 may include a shaft 18 to facilitate driving any appropriate load 20. For example, the load 20 may take the form of a fan, a pump, a blower, or a rotating drum, and may be part of a larger system 22 which may take the form of a residential or commercial machine, such as a clothes dryer, a clothes washer, an oven, a heating, ventilation, and/or air-conditioning unit, a refrigeration unit, or a pool pump, which may include additional electrical or mechanical components not described herein.

The motor control subassembly 14 may be broadly configured to control operation of the electric motor 12, including during starting and normal operation. In various implementations, the various components of the motor control subassembly 14 may be implemented in hardware and/or software, and may be operable to receive input signals from a user interface and/or one or more sensors and to generate control signals based on such input to control operation of the electric motor 12.

Figure 3B:
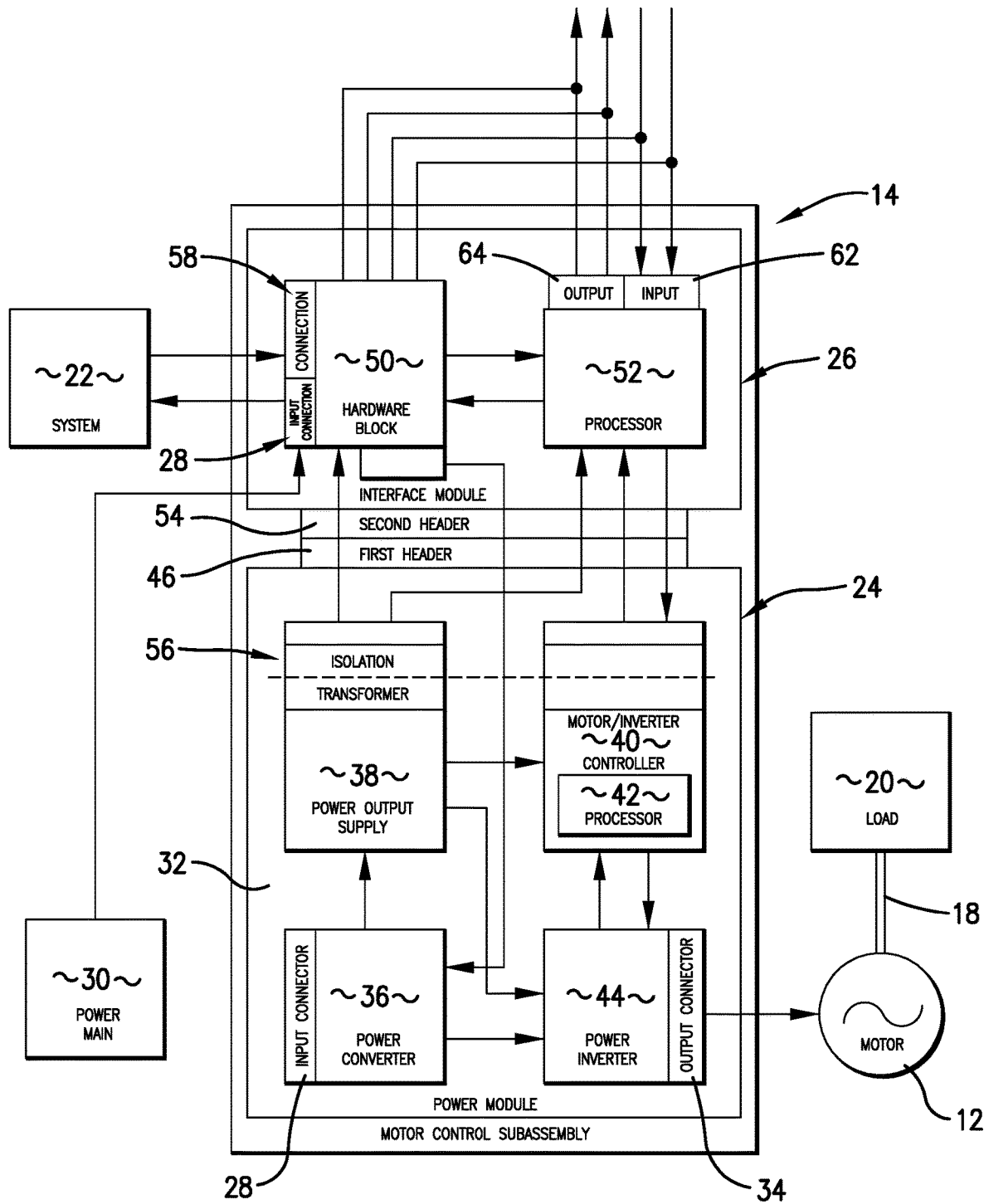
FIG. 3B is a block diagram showing various components of a second implementation of the motor control subassembly of FIG. 1

Referring also to FIGS. 3A and 3B, the interchangeable interface module 26 may be broadly configured to accommodate any of the plurality of different system communication methods by which inputs to and outputs from the motor control subassembly 14 may be sent. The motor control subassembly 14 may broadly comprise a standard power module 24 and the system-specific interface module 26. As used herein, "standard" means that the same general power module design, except perhaps for minor differences that do not substantially affect the power module's basic functionality, can be used with different system-specific interface modules and different system communication methods. Thus, while the system-specific interface module may be swapped or otherwise changed to accommodate any of the plurality of different system communication methods, the power module may remain substantially the same or substantially functionally the same, at least with regard to the different system communication methods. The standard power module 24 may include a power input connector 28 for receiving 1- or 3-phase AC power from a power main 30; a main board 32; and a power output connector 34 for providing 3-phase AC power to the electric motor 12. As shown in FIG. 3B, if the input connector 28 for receiving the alternating current is not part of the standard power module 24 (as it is in FIG. 3A), then it may be part of the system-specific interface module 26. The main board 28 may include a power converter 36 for receiving the AC input power via the input connector 28 and converting it to direct current (DC) power; a multiple output power supply 38 for receiving the DC power and providing it to various other components of the motor control subassembly 14; a communication and motor/inverter controller 40 which may include a controller processor 42; and a power inverter 44 for converting the DC power to three-phase AC power to drive the electric motor 12 via the output connector 34. The main board 32 may be further provided with a first header component 46 for connecting to the interface module 26. Again, the standard power module 24 may include alternate or additional components and still be considered "standard" and without departing from the spirit of the present invention as long as operation of the module 24 as part of the motor 12 remains substantially unchanged. For example, the addition of a jumper or other component which does not substantially affect overall functionality would not result in a meaningfully system-specific power module and would therefore continue to be considered a standard power module.

The system-specific interface module 26 may include a communication interface hardware block 50 and an interface processor 52. The hardware block 50 may be configured to physically facilitate exchanging input and output signals with the larger system 22 and may therefore accommodate a variety of different hardware options, such as different headers using multiple pins. The interface processor 52 may be configured to translate the input signals from the particular system communication method used by the larger system 22 into a standard internal communication method used by the main board 32, and to translate the output signals from the standard internal communication method used by the main board 32 to the particular system communication method used by the larger system 22.

One or more components of the interface module 26 may be mounted on one or more printed circuit boards (PCBs) depending on the requirements of particular applications. The interface module PCB and the main board 32 may be provided with wiring harnesses, integrated PCB-to-PCB headers, and/or snap-together features to facilitate assembly. For example, the PCB of the interface module 26 may be provided with a second header component 54 configured to connect to the first header component 46 of the main board 32 to facilitate communication of electronic signals, including input, output, and isolated power.

Power may be provided from the main board 32 to the interface module 26 via an isolation transformer 56 due to the higher voltage running through main board 32. More specifically, the multiple power output supply 38 may supply, via the isolation transformer 56, a common isolated low voltage to the interface module 26. Furthermore, the multiple power output supply 38 may provide multiple voltages, such as 3.3 VDC for the interface processor 52 and 10 VDC for, e.g., a potentiometer mounted in the equipment manufacturer's cabinet. Thus, in this implementation, the interface module 26 may not depend on the larger system 22 to deliver power via a system communication method connection 58.

The system-specific interface module 26 may further comprise an input element 62 and an output element 64, either or both of which may be physically or otherwise in communication with the interface processor 52. In particular, the input element 62 may be configured to receive input signals from one or more sensors providing information relevant to the operation of the motor 12, the load 20, or the larger system 22. The sensors may include, for example, speed sensors, voltage and/or current sensors, temperature sensors, airflow sensors, or waterflow sensors. The output element 64 may be configured to relay these input signals or to communicate other relevant information (e.g., voltage, current, pulse-width modulation, frequency) to the larger system 22 or another external destination. Either or both of the input and output signals may be used to control one or more aspects of operation of the motor 12, the load 20, or the larger system 22. Either or both of the input and output signals may be translated, as appropriate, to the internal communication method or to the system communication method, and may be communicated through the hardware block 50 or through another physical or non-physical connection.

The interface module 26 may fit into a generic opening in the motor control subassembly 14 portion of the electric motor assembly 10. Thus, different interface modules for accommodating different system communication methods fit into the same opening. The interface module 26 may be inserted into the control subassembly 14 before or after the control subassembly 14 is assembled to the motor 12.

The particular system communication method may be selected from among a plurality of different methods, such as RS485, RS232, analog 0 V to 10 V, industrial (4 mA to 20 mA) current loop, pulse width modulation (PWM), 24 VAC 120 V/240 V, 12 VDC, 24 VDC, 16 pin interface, and wireless. Input may also be provided by, e.g., potentiometers or voltage or current sensors, and output may also be provided by, e.g., light emitting diodes. The control subassembly 14 is configurable to accommodate some or all of these different options with minimal changes. Thus, the inefficiency of maintaining a number of different method-specific motor control subassemblies is avoided.

As described, the interface module 26, including the interface processor 52, may be chosen and inserted into the control subassembly 14 to accommodate a particular system communication method, while the power module 24 may remain substantially unchanged or, at least, substantially functionally unchanged, at least with regard to the system communication method. In an alternative implementation, one or more components of the interface module 26 may remain the same while one or more other components are selected and inserted. For example, in one implementation, the communication interface hardware component 50 may be chosen and inserted and a non-specific interface processor 52 may be reprogrammed or otherwise provided with programming (e.g., by wireless reprogramming, insertion of a memory element, or reference to look-up tables in a memory element) sufficient to accommodate the particular system communication method.

Figure 4:
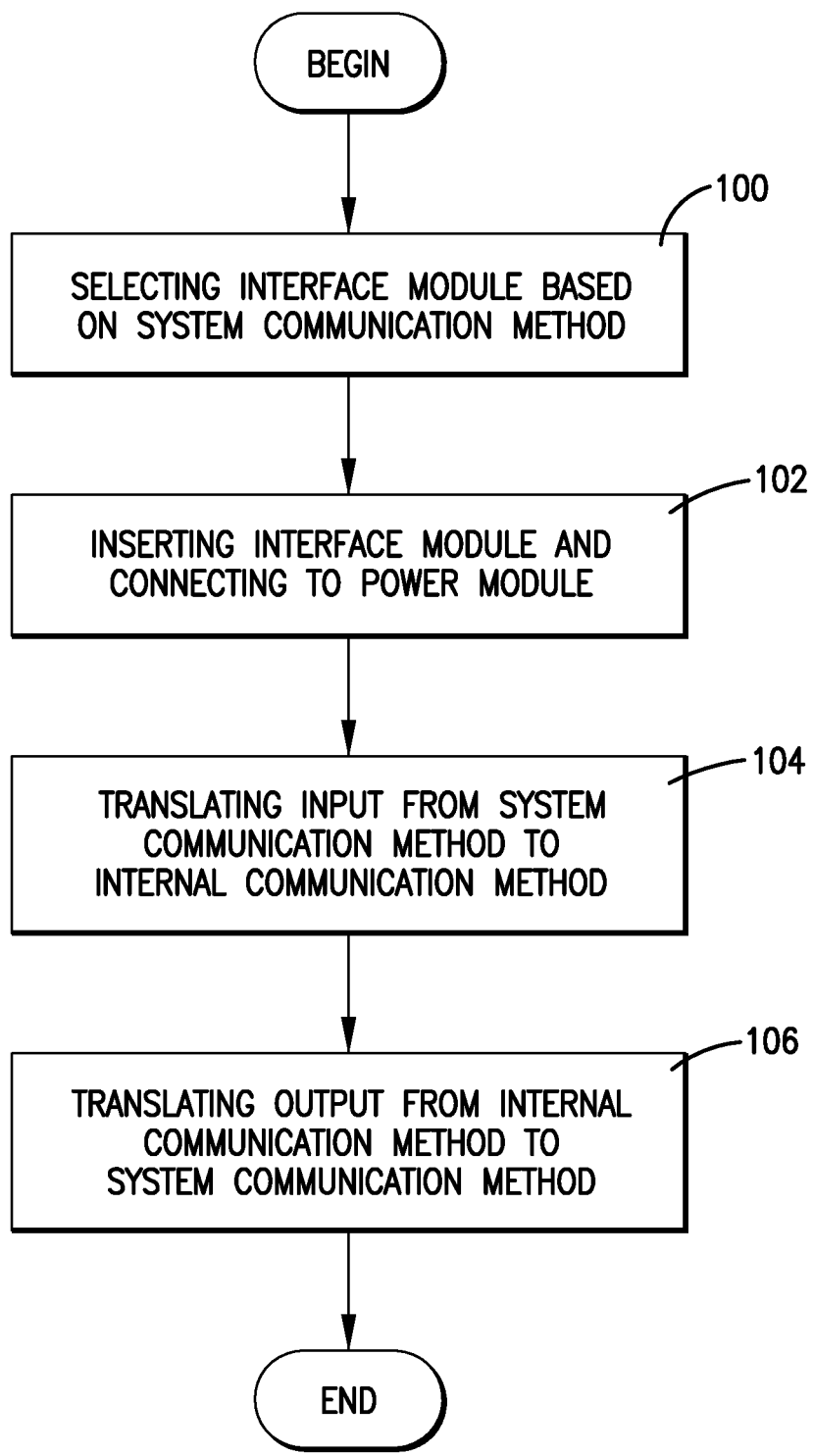
FIG. 4 is a flowchart of steps involved in deploying and using the system-specific interface module of FIG. 1.

Referring to FIG. 4, a flowchart depicts steps involved in deploying and using the system-specific interface module 26. The system-specific interface module 26 is selected based on the particular system communication method used by the larger system 22 in which the electric motor assembly 10 is to be or is already incorporated, as shown in step 100. The selected interface module 26 is connected to the power module 24 and inserted into the motor control subassembly 14, as shown in step 102. In one implementation, the interface module 26 may be provided on a single PCB, and the single PCB may present a header component 54 which may connect to a corresponding header component 46 presented by the power module 24 to facilitate communication of electronic signals, including input, output, and isolated power. The interface module 26 may then receive and translate input from the larger system 22 provided in the particular system communication method into the standard internal communication method used by the power module 24, as shown in step 104. The interface module 26 may also receive and translate output from the power module 24 in the standard internal communication method into the particular system communication method used by the larger system 22, as shown in step 106. Thus, in one implementation, no changes other than inserting and connecting the interface module 26 need be made in order to accommodate the particular system communication method—i.e., the power module 24, the standard internal communication method between the power modular 24 and the interface module 26, and the power supplied by the power module 24 to the interface module 26 may all remain the same regardless of which particular system communication method is used—and the interface module 26 facilitates communication between the standard power module 24 and the larger system 22.

Thus, the present invention provides advantages over the prior art, including that it provides ease of assembly during manufacturing of the motor control subassembly and the electric motor assembly; facilitates manufacturing on demand; allows for accommodating many different system communication methods while maintaining lower inventory counts of components; speeds delivery of products to market; and requires fewer qualification tests.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system-specific interface module for a motor control subassembly having a standard power module for powering and controlling operation of an electric motor configured to drive a load within a larger system, wherein the larger system uses a particular system communication method, the system-specific interface module comprising:
   a communication interface component configured to exchange input signals and output signals with the larger system using the particular system communication method; and
   an interface processor configured to translate the input signals from the particular system communication method used by the larger system into a standard internal communication method used by the standard power module and to translate the output signals from the standard internal communication method used by the standard power module into the particular system communication method used by the larger system, and thereby provide bidirectional translation to facilitate bidirectional communication between the larger system and the standard power module,
   wherein the system-specific interface module is physically removeable and replaceable with a different system-specific interface module to accommodate a different particular system communication method without removing and replacing the standard power module.

2. The system-specific interface module as set forth in claim 1, wherein the standard power module includes—
   a power converter configured to convert alternating current to direct current,
   a controller processor configured to receive input for controlling operation of the electric motor and generate output regarding operation of the electric motor, and
   a power inverter configured to convert the direct current to alternating current to drive the electric motor.

3. The system-specific interface module as set forth in claim 2, wherein the interface processor communicates directly with the controller processor.

4. The system-specific interface module as set forth in claim 1, wherein the system-specific interface module is housed with the standard power module in the motor control subassembly.

5. The system-specific interface module as set forth in claim 1, wherein operation of the system-specific interface module is powered by the standard power module.

6. The system-specific interface module as set forth in claim 5, further including an isolation transformer, wherein isolated power is provided by the standard power module to the system-specific interface module via the isolation transformer.

7. The system-specific interface module as set forth in claim 1, wherein the electric motor is selected from the group consisting of: three-phase, multi-pole alternating current induction motors, permanent magnet motors, and switched reluctance motors.

8. The system-specific interface module as set forth in claim 7, wherein the load is selected from the group consisting of: fans, pumps, blowers, and rotating drums.

9. The system-specific interface module as set forth in claim 7, wherein the larger system is a residential or commercial machine selected from the group consisting of: clothes dryers, clothes washers, ovens, heating units, ventilation units, air-conditioning units, refrigeration units, and pool pumps.

10. The system-specific interface module as set forth in claim 1, wherein the system-specific interface module is connected to the standard power module by a header.

11. The system-specific interface module as set forth in claim 1, wherein the system-specific interface module is connected to the standard power module by a wiring harness.

12. The system-specific interface module as set forth in claim 1, wherein the system-specific interface module is further configured to receive and translate input from a potentiometer into the standard internal communication method used by the standard power module.

13. The system-specific interface module as set forth in claim 1, wherein the system-specific interface module is further configured to receive and translate input from a voltage sensor or a current sensor into the standard internal communication method used by the standard power module or into the particular system communication method used by the larger system.

14. The system-specific interface module as set forth in claim 1, further including an input element configured to receive an input signal from a sensor and to communication the input signal to the interface processor.

15. The system-specific interface module as set forth in claim 14, wherein the interface processor is further configured to translate the input signal into the standard internal communication method used by the standard power module.

16. The system-specific interface module as set forth in claim 14, wherein the sensor is selected from the group consisting of: speed sensors, voltage sensors, current sensors, temperature sensors, airflow sensors, and waterflow sensors.

17. The system-specific interface module as set forth in claim 14, the system-specific interface module further including an output element configured to relay the input signal as an output signal to the larger system.

18. The system-specific interface module as set forth in claim 17, wherein the interface processor is further configured to translate the output signal into the particular system communication method used by the larger system.

19. A system-specific interface module for a motor control subassembly having a standard power module for powering and controlling operation of an electric motor configured to drive a load within a larger system, wherein the larger system uses a particular system communication method, and the standard power module includes an isolation transformer configured to provide isolated power, the system-specific interface module comprising:
   a communication interface component configured to exchange input signals and output signals with the larger system using the particular system communication method; and an interface processor configured to translate the input signals from the particular system communication method used by the larger system into a standard internal communication method used by the standard power module and to translate the output signals from the standard internal communication method used by the standard power module into the particular system communication method used by the larger system, and thereby provide bidirectional translation to facilitate bidirectional communication between the larger system and the standard power module, wherein the system-specific interface module is powered by the isolated power provided by the isolation transformer, wherein the standard power module is not specifically configured to accommodate the particular system communication method, and the system-specific interface module is specifically configured to accommodate the particular system communication method, and wherein the system-specific interface module is physically removeable and replaceable with a different system-specific interface module to accommodate a different particular system communication method without removing and replacing the standard power module.

20. A system-specific interface module for a motor control subassembly having a standard power module for powering and controlling operation of an electric motor having a shaft configured to drive a load within a larger system, wherein the larger system uses a particular system communication method, and the standard power module including— an isolation transformer configured to provide isolated power, a controller processor configured to receive input for controlling operation of the electric motor and generate output regarding operation of the electric motor, and a first header component, and the system-specific interface module comprising:

a communication interface component configured to exchange input signals and output signals with the larger system using the particular system communication method;

an interface processor configured to translate the input signals from the particular system communication method used by the larger system into a standard internal communication method used by the standard power module and to translate the output signals from the standard internal communication method used by the standard power module into the particular system communication method used by the larger system, and thereby provide bidirectional translation to facilitate bidirectional communication between the larger system and the standard power module; and a second header component configured to connect to the first header component and thereby facilitate communicating electronic signals between the controller processor and the interface processor, wherein the system-specific interface module is powered by the isolated power provided by the isolation transformer, wherein the standard power module is not specifically configured to accommodate the particular system communication method, and the system-specific interface module is specifically configured to accommodate the particular system communication method, and wherein the system-specific interface module is physically removeable and replaceable with a different system-specific interface module to accommodate a different particular system communication method without removing and replacing the standard power module.

* * * * *